United States Patent [19]
Shido

[11] Patent Number: 5,995,704
[45] Date of Patent: Nov. 30, 1999

[54] INFORMATION PROCESSING APPARATUS CAPABLE OF READILY CHANGING RESOLUTION

[75] Inventor: Shunichi Shido, Sagamihara, Japan

[73] Assignee: Canon Kabushiki Kaisha, Tokyo, Japan

[21] Appl. No.: 08/798,627

[22] Filed: Feb. 11, 1997

[30] Foreign Application Priority Data

Feb. 15, 1996 [JP] Japan ................................. 8-052474

[51] Int. Cl.⁶ ..................................................... H04N 5/76
[52] U.S. Cl. ............................................. 386/46; 386/124
[58] Field of Search ............................. 386/46, 124, 52, 386/104, 125; 369/126; 348/714, 718; H04N 5/76

[56] References Cited

U.S. PATENT DOCUMENTS

| | | | |
|---|---|---|---|
| 5,282,191 | 1/1994 | Yamano et al. | 369/126 |
| 5,440,401 | 8/1995 | Parulski et al. | 386/124 |
| 5,510,858 | 4/1996 | Shido et al. | 386/104 |
| 5,581,364 | 12/1996 | Hatanaka et al. | 386/46 |
| 5,778,134 | 7/1998 | Sakai et al. | 386/46 |

FOREIGN PATENT DOCUMENTS

| | | |
|---|---|---|
| 61-080536 | 4/1986 | Japan . |
| 62-281138 | 12/1987 | Japan . |
| 63-161552 | 7/1988 | Japan . |
| 63-161553 | 7/1988 | Japan . |

*Primary Examiner*—Huy Nguyen
*Attorney, Agent, or Firm*—Fitzpatrick, Cella, Harper & Scinto

[57] ABSTRACT

An information processing apparatus for scanning a recording medium by means of a probe and recording and reading information by means of a physical interaction occurring between the recording medium and the probe, including, a device for generating a plurality of sets of image information with different resolutions from input image information, a device for successively recording the sets of of image information in a predetermined order on the medium, and a device for reading only a reproduction-necessary region on the recording medium, according to a resolution demanded, upon reproduction of the image information.

2 Claims, 8 Drawing Sheets

AREA B
AREA A

FIG. 10

AREA A'

INFORMATION PROCESSING APPARATUS CAPABLE OF READILY CHANGING RESOLUTION

BACKGROUND OF THE INVENTION

1. Field of the Invention

The present invention relates to an information processing apparatus for recording and/or reproducing information utilizing a physical interaction (tunnel current, interatomic force, etc.) occurring when a probe is put near a recording medium.

2. Related Background Art

In recent years, applications of memory materials are the core of electronics industries including computers and equipment related thereto, video disks, digital audio disks, and so on, and development of suitable material is very active.

The performance required for memory materials differs depending upon their applications, and quick response speeds of recording and reproduction are necessary and indispensable.

Conventional memories were mainly semiconductor memories and magnetic memories using materials such as magnetic materials and semiconductor materials, but the recent progress of laser technology has brought cheap and high-density recording media by optical memories using an organic thin film of an organic dye, a photopolymer, or the like.

On the other hand, recently developed was the scanning tunneling microscope (hereinafter abbreviated as "STM") capable of directly observing the electron structure of surface atoms of a conductor [Binnig et al., Phys. Rev. Lett., 49, 57 (1982)], which enabled high-resolution measurement of real space image for any single-crystal and amorphous materials and which had an advantage of capability of observing a sample at low electric power without damaging the sample by an electric current. In addition, the scanning tunneling microscope operates even in the atmosphere and can be used for a variety of materials, and applications thereof in a wide range are thus expected.

The STM utilizes a phenomenon that a tunnel current flows when a metal probe (probe electrode) is brought to the proximity of an electroconductive substance, approximately up to the distance of 1 nm, while a voltage is applied between the metal probe and the electroconductive substance.

This electric current is so sensitive as to respond exponentially to a change of distance between the two elements. When the probe scans so as to keep the tunnel current constant, it is also possible to read a variety of information concerning the total electron cloud in the real space.

The resolution in the in-plane direction achieved by this technique is approximately 0.1 nm. It is thus fairly possible to achieve high-density recording and/or reproduction on the order of atomic scale (i.e., on the subnanometer order) by applying the principle of the STM.

For example, the information processing apparatus disclosed in the bulletin of Japanese Laid-Open Patent Application No. 61-80536 is arranged to write information by removing atomic particles that have been absorbed on a surface of a medium by means of an electron beam or the like and to reproduce the data by an STM.

There is a proposed method for using a thin film layer of a material having a memory effect for voltage-current switching characteristics, for example a thin film layers of organic compound having a conjugated $\pi$ electron system or a chalcogenides, as a recording layer and performing recording and/or reproduction by means of an STM (Japanese Laid-open Patent Applications No. 63-161552 and No. 63-161553). This method can achieve bulk recording and/or reproduction of even 1 Tbit/cm, supposing that the bit size recorded is 10 nm.

An example for a scanning mechanism of the probe electrode is a cantilever type (Japanese Laid-Open Patent Application No. 62-281138), and, according thereto, a plurality of cantilever mechanisms of $SiO_2$ can be made in the size of approximately the length 100 p$\mu$, the width 10 to 20 $\mu$m, and the thickness 0.5 $\mu$m on an Si substrate, and writing and reading circuits are also integrated on the same substrate.

Such bulk memory systems are useful for processing image data, including, especially, very large amounts of information as database of large information amounts).

For example, they are indispensable for high-definition televisions, high-resolution still video systems, and so on, recently showing extreme progress of technology.

In such bulk memory systems, however, if input information is always read out at a constant resolution of high definition, or at a detailed level, reading will require a lot of time and will be often wasted.

Specifically, it is the present status that the memory systems as described above require a lot of time for writing or reading of large amounts of information because the scanning frequency limit, due to the physical condition of resonance frequency of cantilever or the like, is several hundred Hz and the limit on the transfer rate of information per probe caused thereby is several hundred kHz or less. In addition, detailed information and high definition resolutions are not always necessary, depending upon the purpose of output in a given instance, the output device in question, or the like. For example, in the cases of searching, access to data head, and the like, priority is given to processing speed over quality of image. In addition, for example, in a case of the still video system or the like, a high resolution is necessary when an image is printed out by the electrophotographic technology or the like; however, a monitor output does not require such a high resolution. Therefore, it is not always necessary to read out hundred percent of the information recorded.

Also in the case of recording, when only a necessary part is desired to be recorded in detail or when speed is important, we may employ a method of input of data arranged to record data first roughly and to locally supplement necessary portions in detail later.

SUMMARY OF THE INVENTION

An object of the present invention is to realize a great reduction of reading time in the above bulk memory systems using the STM or the like.

The above object can be achieved by an information processing apparatus for scanning a recording medium by means of a probe and performing recording and reading of information by physical interaction occurring between the two elements, comprising:

means for generating a plurality of image information with different resolutions from input image information;

means for successively recording said plurality of image information in a predetermined order on said medium; and means for reading only a reproduction-necessary region on said recording medium, according to a resolution demanded, upon reproduction of said image information.

The details will be described in the description of the preferred embodiments which follows the accompanying drawings.

DETAILED DESCRIPTION OF THE PREFERRED EMBODIMENTS

The preferred embodiments of the present invention will be described in detail by reference to the drawings.

[Embodiment 1]

Figure 1:
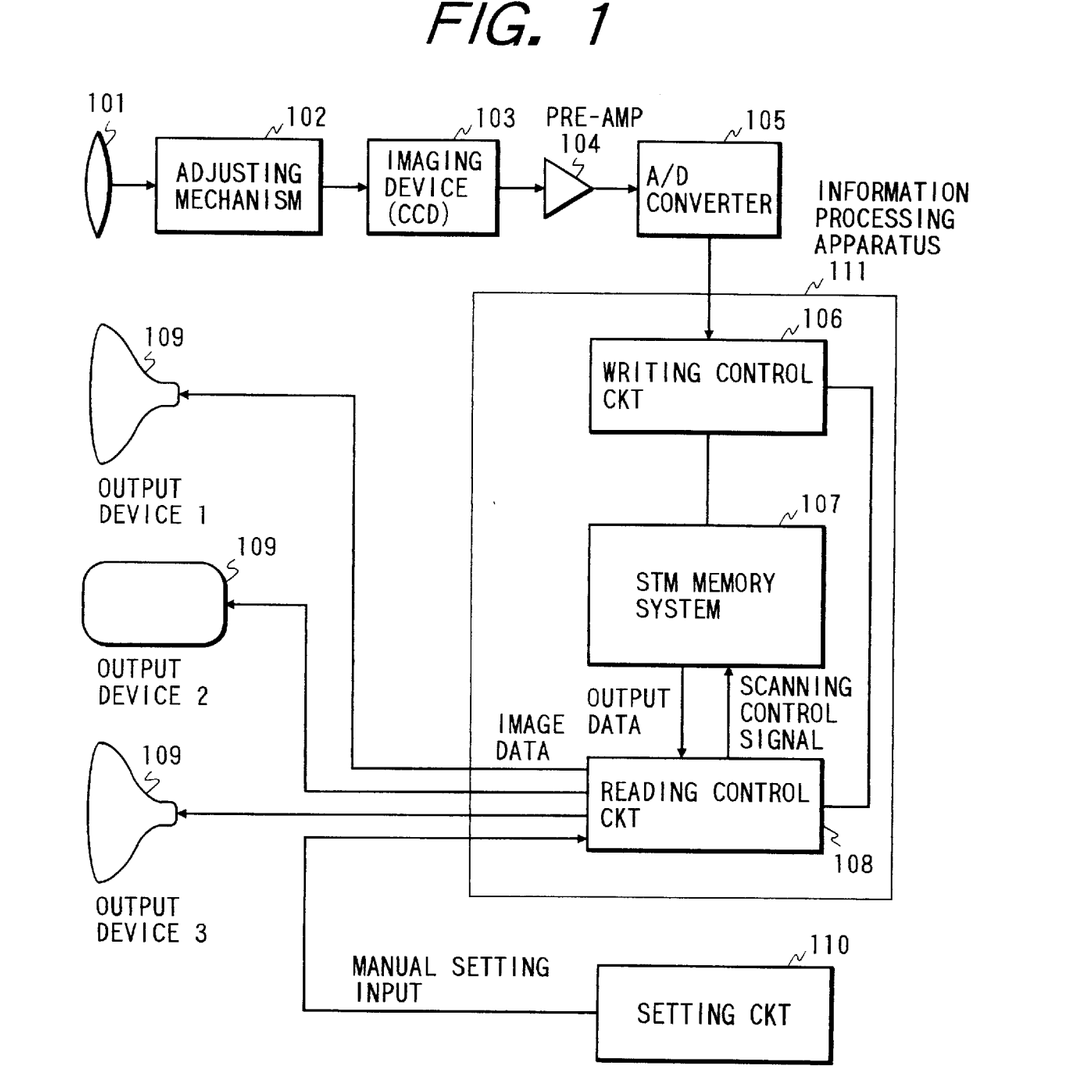
FIG. 1 is a block diagram to show the basic configuration of a still camera in Embodiment 1 using the information processing apparatus of the present invention.

FIG. 1 is a block diagram to show Embodiment 1 of the present invention, which is focused on input/output of information where the memory system of the present invention is applied to a high-definition digital still camera.

The operation for capturing an image is first described referring to the drawing.

Image information incident through lens 101 is guided through an adjusting mechanism 102, including an aperture stop, a shutter, and so on, to be incident at an accurate level into an imaging device 103. Then the image is converted to an electric signal, the electric signal is amplified by a preamplifier 104, and the amplified signal is converted to a digital signal by an A/D converter 105.

Of course, the A/D converter 105 is equipped with a filter for anti-aliasing, though not shown.

The image information after converted to the digital signal is put into the image processing apparatus 111 which is a characteristic part in the present invention.

A writing control circuit 106 rearranges the input information into an data string matched with a STM memory system.

Then the rearranged data is stored in the STM memory system. The writing control circuit 106 will be described in detail hereinafter.

The image output operation is next explained.

The reading control circuit 108 outputs a scanning control signal compatible with an output device. The scanning control signal is preliminarily set according to an output device by a setting circuit 110. Alternatively, the scanning control signal can be manually set by a user.

The memory system 107 outputs data according to the scanning control signal to the reading control circuit 108.

The reading control circuit 108 shapes the data sent thereto and transmits it to an output device 109 upon request.

Control is made between the writing control circuit and the reading control circuit so as not to perform writing and reading simultaneously.

Nowadays, there are a variety of image output devices. Examples of the image output devices include image monitors such as CRTs, devices for printing an image on a sheet or the like, such as printers, other storage devices such as magnetic disks or compact disks, communication equipment, and so on.

Their resolutions are also spread over a wide range.

Examples of the resolutions include relatively low resolutions as in the normally used CRTs, high resolutions necessary for high-definition monitors, high-definition printers or printing machines and the like, resolutions fixed in some measure in respect of the transmission time of data or the like, though high-definition images are desired actually, as in facsimile machines, and so on.

There are many cases in which high-definition images are necessary for output, but a high definition is not always necessary for searching or the like. In such cases, read-out of 100% of the data upon searching is not wise because it lengthens the searching time.

It is thus desirable to arrange the apparatus so as to be capable of readily outputting data in resolutions of levels according to respective needs.

The present invention realizes this goal by providing the apparatus with the writing control circuit 106 and the reading control circuit 108 and thereby controlling input/output of data to the memory system 107 using the STM technology.

Next described is the memory system 107 using the STM technology.

Figure 2:
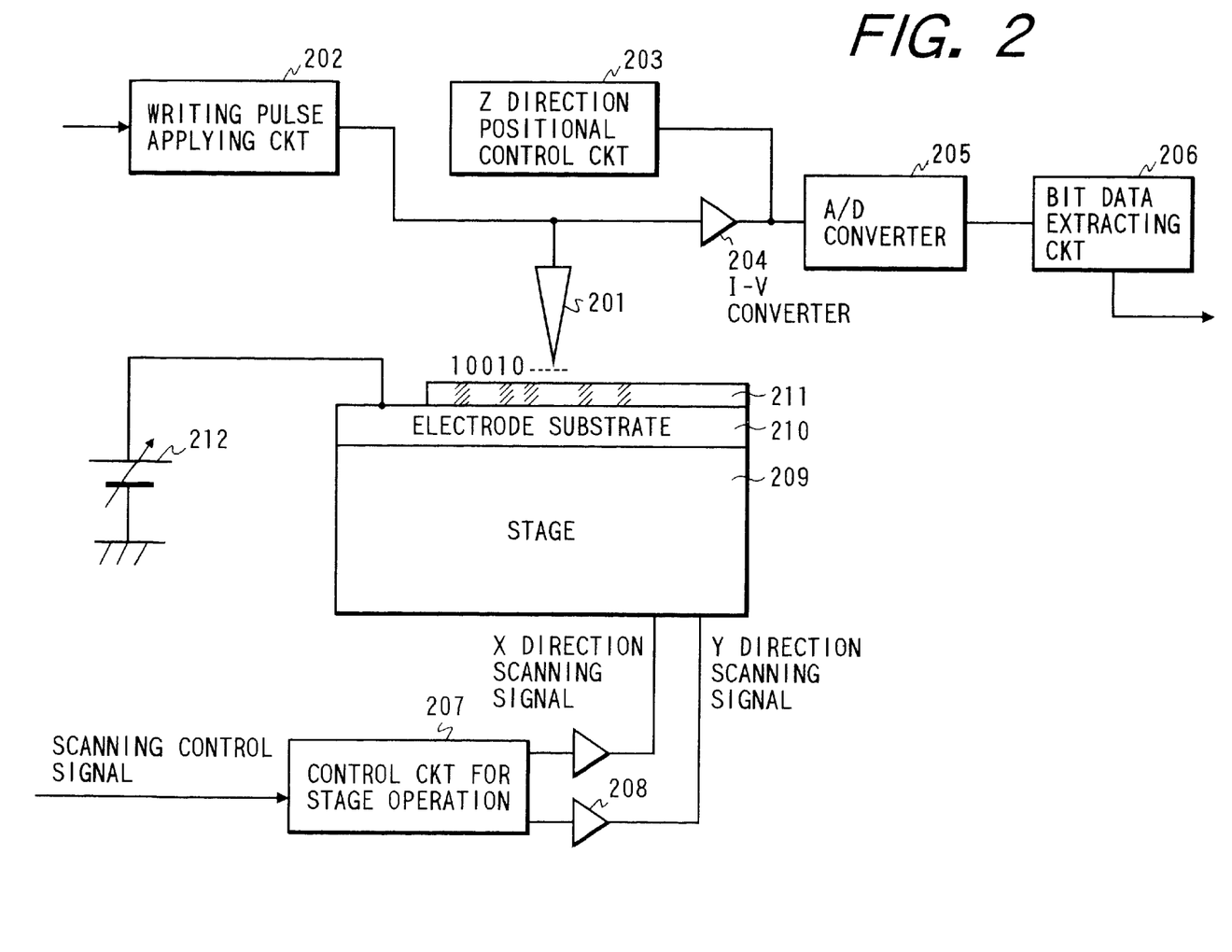
FIG. 2 is a drawing for explaining the fundamental principle of a memory using the STM technology.

The STM memory system is realized by means of the configuration as shown in FIG. 2.

A reading bias applying circuit 212 applies a certain predetermined bias to an electrode substrate 210. When the distance between a probe 201 and a recording medium 211 or the electrode substrate 210 becomes not more than a certain specific distance by means of a Z-direction positional control circuit 203, tunnel current is detected between the electrode substrate 210 and the probe 201 or between the recording medium 211 on the electrode substrate and the probe.

The tunnel current detected is converted to a voltage signal by a current-voltage (I-V) converter 204 and the voltage signal is sent to the Z-direction positional control circuit 203 and to an A/D converter 205.

The Z-direction positional control circuit 203 performs positional control of the probe so as to keep the distance constant between the electrode substrate and the probe or between the recording medium and the probe, from values of the tunnel current detected. On the other hand, the A/D converter is provided with a filter for anti-aliasing, and the tunnel current data after A/D conversion is then sent to a bit data extracting circuit 206 to be separated into signals of 0 and 1 of pits.

Specifically, for example, 1 is assigned to portions with an electrical conductivity changed (hatched portions in the drawing) in the recording medium 211 and 0 to portions with an electrical conductivity not changed.

Recording of data is carried out by applying a writing pulse voltage with a predetermined amplitude between the probe and the electrode substrate by a writing pulse applying circuit 202. On the other hand, the operation in the plane of the recording medium is carried out by stage 209.

A stage operation control circuit 207 receives the scanning control signal and outputs main scanning and sub-scanning signals in accordance with an instruction thereof.

The signals are amplified by respective amplifiers 208 to be applied to actuators of piezoelectric devices or the like, not shown, attached to the stage, whereby the stage is controlled in raster scanning.

The schematic diagram shown in FIG. 2 shows only one tunnel current detecting system, but apparatuses actually used are provided with a set of probes, taking the transmission rate of data into consideration.

Figure 3:
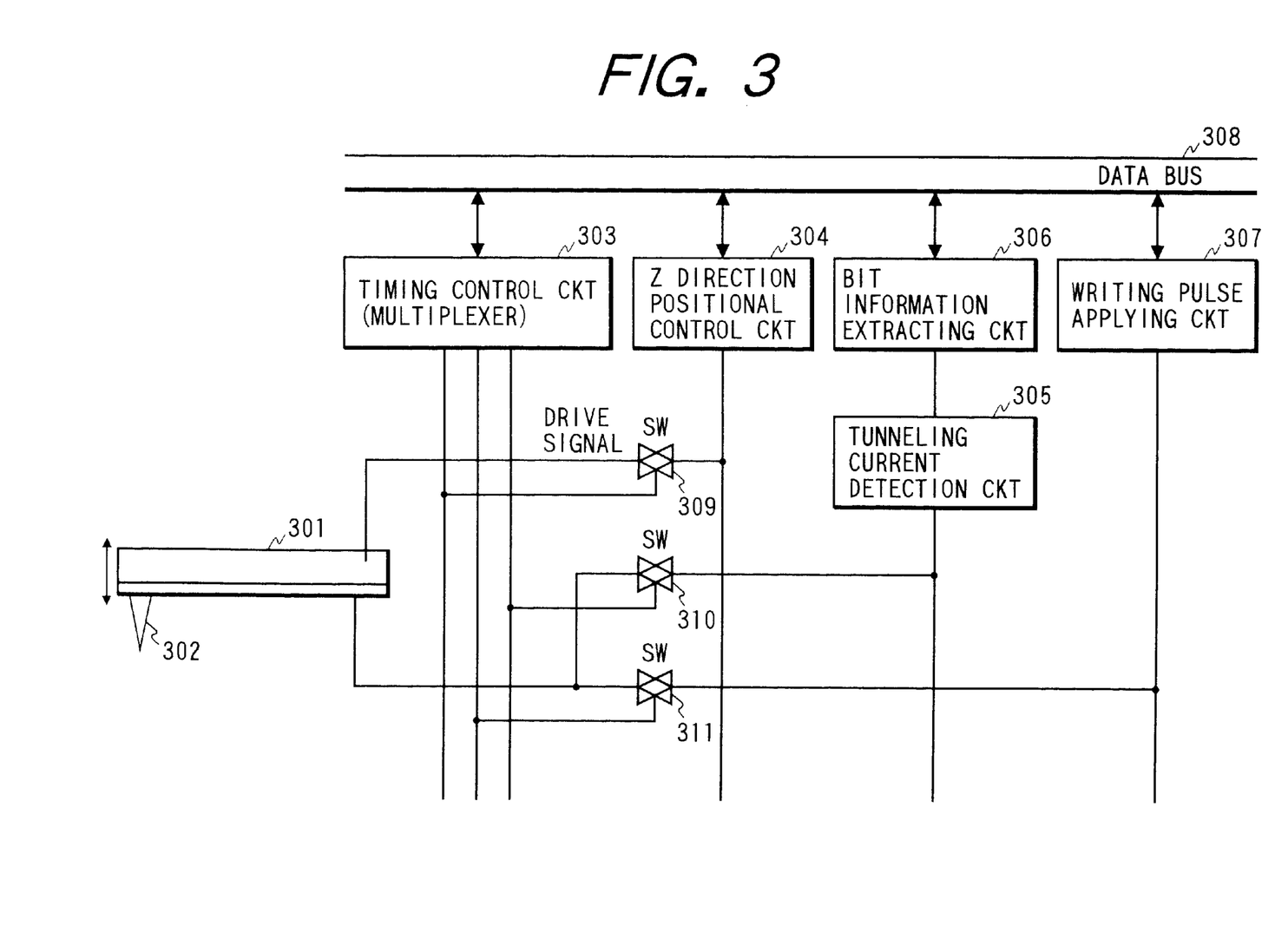
FIG. 3 is a drawing to show a concept of control switching in the configuration of a memory with multiple probes using bimorph cantilevers.

As shown in FIG. 3, a bimorph cantilever 301 using piezoelectric members fabricated by semiconductor processes is used for Z-direction positional control, and its operation is controlled by a Z-direction positional control circuit 304.

The tunnel current signal is subjected to current-voltage conversion by a tunnel current detecting circuit 305 and the signal obtained is sent to a bit information extracting circuit 306.

The bit information extracting circuit 306 is configured to extract bit information, based on the magnitude of signal or the like, and to transmit the information onto a data bus.

Data is written in such a manner that a writing pulse applying circuit 307 receives writing data from the data bus and writes it in the medium.

The control system as illustrated is for one probe unit, but practical apparatus are provided with a plurality of probe units arranged in parallel and with one control system for performing multiplex control of the plural probes by opening and closing switches 309 to 311 for each probe.

This control of switches is carried out by a timing control circuit 303.

The reading/writing procedures, which are characteristic parts of the present invention, will be described in detail with reference to FIG. 4 to FIG. 7.

Figure 4:
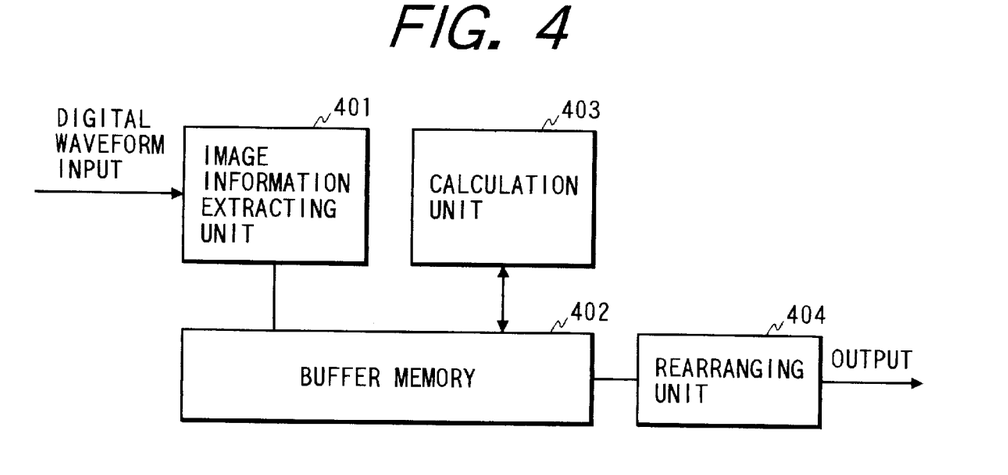
FIG. 4 is a drawing to show the configuration of a writing control circuit in the information processing apparatus of the present invention.

The internal structure of the writing control circuit 106 is first shown in FIG. 4.

A signal after A/D conversion is divided into signals of respective pixels by an image information extracting unit 401 and the signals are stored as an original image in a buffer memory 402. A calculation unit 403 decomposes the image data as to frequency regions.

For example, the pyramid transform, sub-band transform, wavelet transform, or the like is preferably used for hierarchical representation in multiple resolutions.

Figure 7:
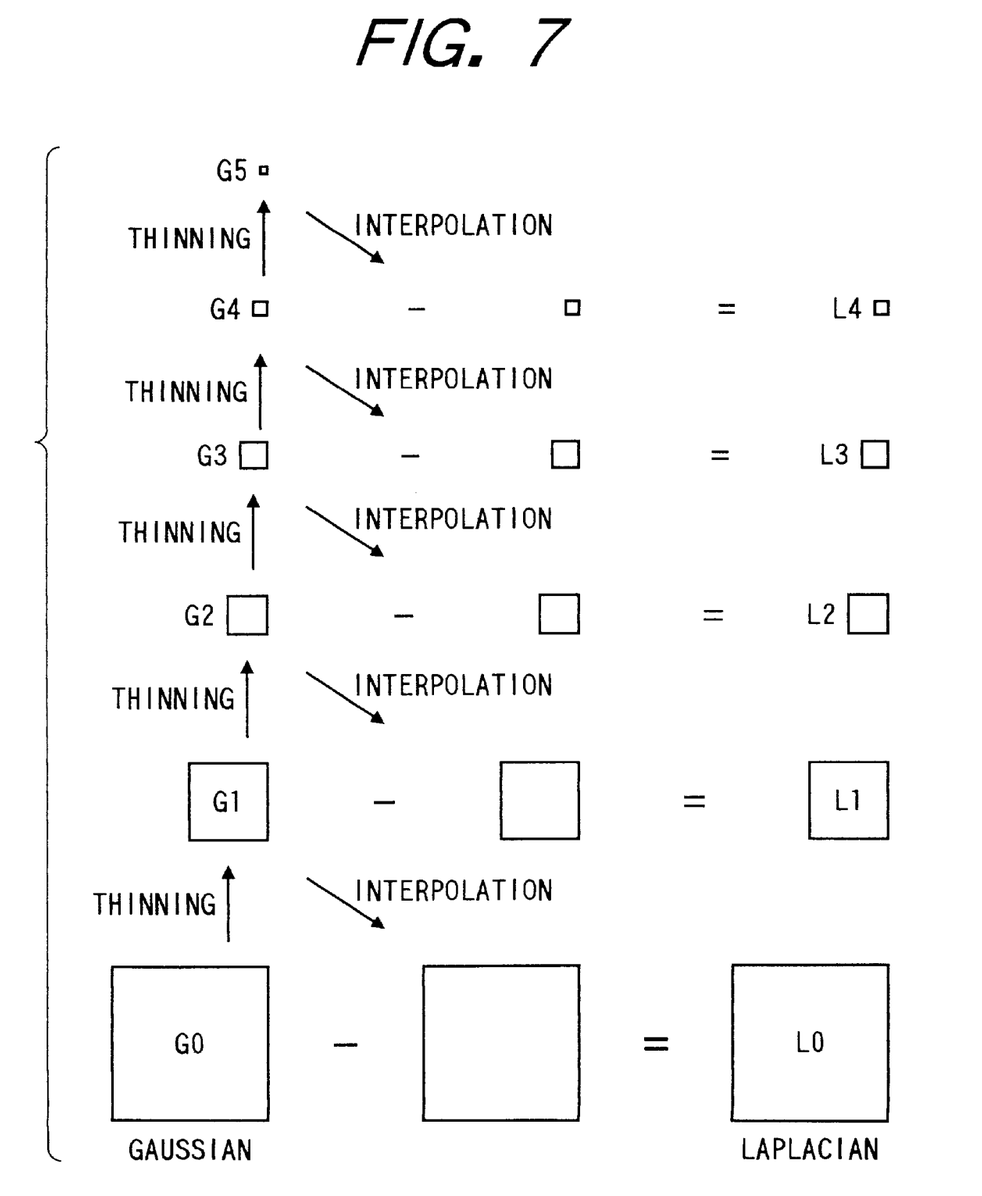
FIG. 7 is a drawing to illustrate the pyramid transform.

The present embodiment employs the pyramid transform. FIG. 7 shows a diagrammatic illustration of the pyramid transform. First, letting G0 be the original image, it is transformed to G1 by a low-pass filter. Then transformation is effected in succession.

At this time it is seen from the relation among these images that an image can be obtained at an arbitrary resolution in the range of the n-th powers of 2 by the sum of a G image with the lowest resolution and L image series.

Thus, the present embodiment shows an example in which the generation of the image in FIG. 7 is expanded to L4. The image of G5, generated by transformation, will be referred to as data of level 1, the image of L4 as data of level 2, the image of L3 as data of level 3, the image of L2 as data of level 4, the image of L1 as data of level 5, and the image of L0 as data of level 6.

The amounts of data of the respective levels are 4 times, 16 times, 64 times, and 256 times greater than the amount of data of level 1.

Figure 6A:
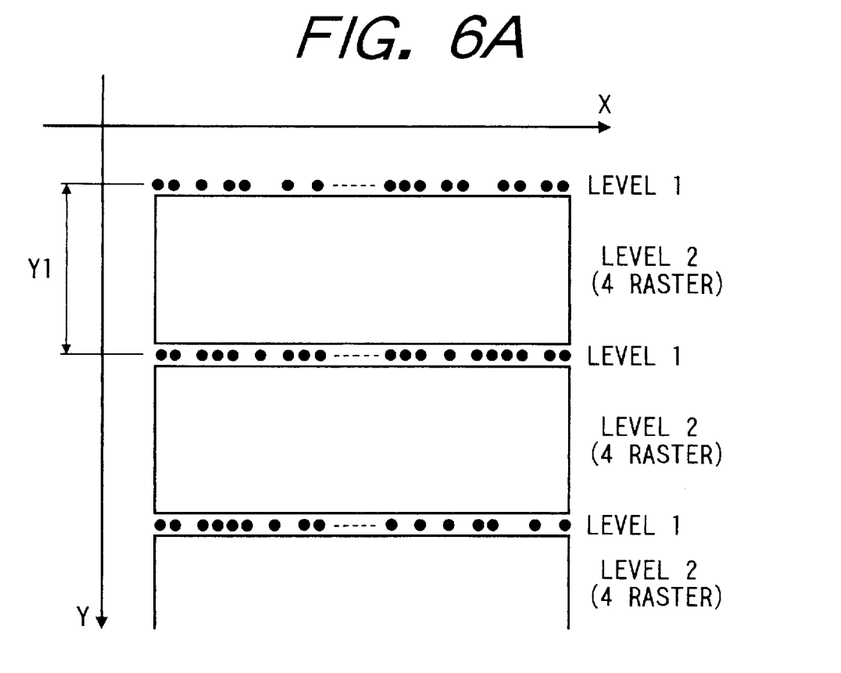
FIGS. 6A and 6B are drawings to show an example of arrangement of recorded information in Embodiment 1 of the still camera using the information processing apparatus of the present invention.
Figure 6B:
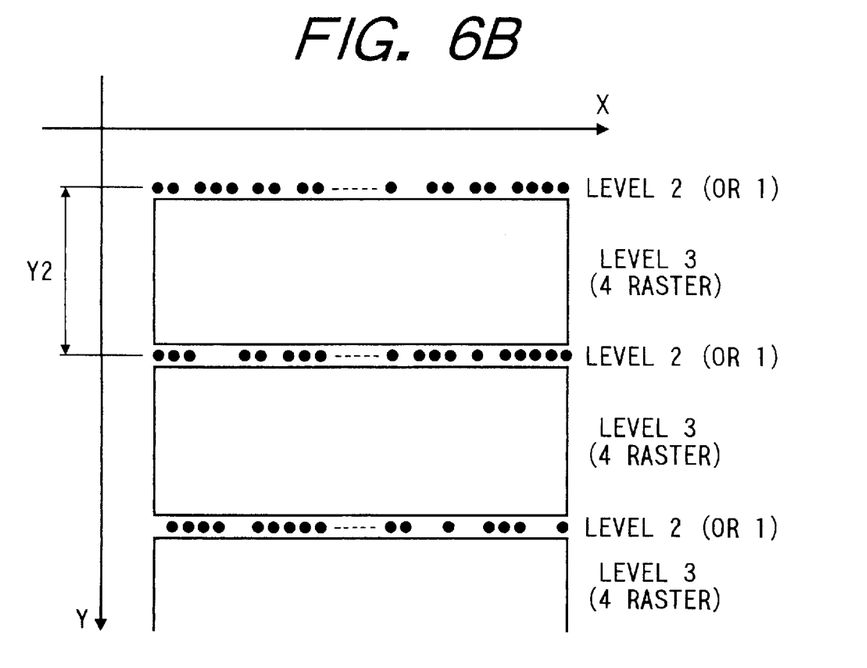

Since a recording area of data of each region on the recording medium of STM memory system is determined simply by a ratio of data numbers, a rearranging unit 404 rearranges the data, for example, so that the data is arranged as shown in FIGS. 6A and 6B on the medium of memory system 107.

Practically, output data is one rearranged by the rearranging unit selectively outputting data for each raster from the data of the image series placed on the buffer memory by the calculation unit 402.

The STM memory system 107 records signals sent thereto in the form of a data bit string on the medium as they are.

Data arrangement of FIGS. 6A and 6B will be described.

FIG. 6A shows the relation between the data of level 1 and level 2.

Recorded in anyone raster is only data of one same. Strings of solid dots diagrammatically show bit strings on the medium, and the X- and Y-axes indicate spatial positions on the medium, wherein X represents the main scanning direction and Y the sub-scanning direction.

Since the data of level 2 is four times the data of level 1 in amount, sets of data of level 1 and data of level 2 are arranged at equal intervals, each set including one raster for level 1 and four rasters for level 2 (four rasters of level 2 are arranged at equal intervals in each rectangle in the drawing).

Next, FIG. 6B shows data arrangement between adjacent levels 2 and between adjacent level 2 and level 1 of FIG. 6A.

Levels 3 are arranged at equal intervals between adjacent levels 2. Since the ratio of data amounts of level 2 and level 3 is 4 as described above, four rasters of level 3 exist between adjacent levels 2 (four rasters of level 3 are arranged at equal intervals in each rectangle of the figure).

Actually, when the levels 2 and levels 1 are arranged at equal intervals, there are five regions represented by the respective rectangles of level 3 as shown in FIG. 6B between the raster of level 1 and the raster of next level 1. Thus the first region is determined as a vacant region.

Summarizing the above, the raster groups of level 1 are arranged at equal intervals of Y1 and the raster groups of level 2 and level 1 are arranged at equal intervals of Y2. In the case of the present embodiment the data up to level 6 is arranged in fact in this manner, though not shown.

The reading operation will be described in detail.

Since this system has a dynamic system (the stage, cantilever, etc.) as described above, there exists the phenomenon of a resonance frequency.

Because of that phenomenon, many cases will have the limit of scanning frequency at several hundred Hz even with some change of the shape, rigidity, or the like.

In such cases, the limit of transmission rate per probe is several hundred kbit/sec even when the bit size is 10 nm and when the main scanning range is 1 $\mu$m.

It is thus important to scan only necessary data in order to draw the data efficiently.

The data on the medium in the memory system 107 is recorded as shown in FIGS. 6A and 6B and discussed previously.

Figure 5:
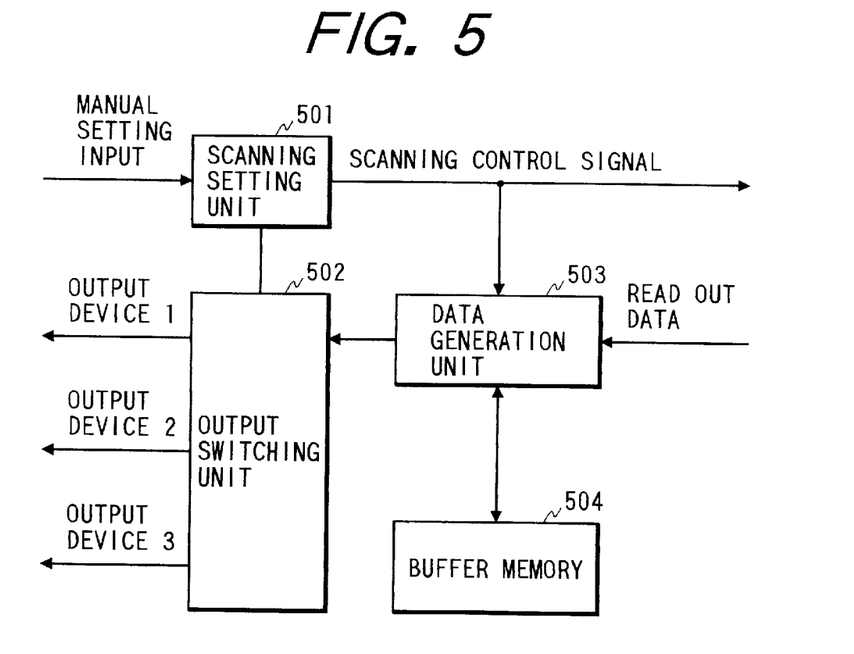
FIG. 5 is a drawing to show the configuration of a reading control circuit in the information processing apparatus of the present invention.

The internal structure of the reading control circuit is as shown in FIG. 5.

In the case of a process of the output device 1 requiring signals of level 1 (compressed data at 1/256), an output switching unit 502 switches its output destination to the output device 1 and in accordance therewith a scanning setting unit 501 is arranged to output a signal designating a unit movement amount in the sub-scanning direction, preliminarily determined corresponding to the output device, as a scanning control signal.

This may be set manually by a user in correspondence to the output device or the apparatus may be provided with a switching device arranged to automatically set a certain value upon selection of a certain output device. The present embodiment is configured to permit input of manual setting signal. By this, data of only level 1 can be scanned by setting the unit movement amount in the sub-scanning (Y) direction shown in FIG. 6A to Y1, so that only information of level 1 can be extracted.

Since the data areas of the other levels are not scanned, 100% of the transmission rate of several hundred kbit/sec is used for output of data of level 1, and transmission thus becomes very quick.

Next, in the case of an output device necessitating information of level 2, the data of level 2 (including level 1) is read out as setting the unit movement amount in the sub-scanning direction to Y2 in the same manner, and then a data generation unit 503 and a buffer memory 504 add the waveform of level 1 and the remaining waveform of level 2 and output the resultant.

According to this method, for output devices necessitating data of level 3, 4, 5, or 6, the data is also read without waste by setting only the unit movement amount in the sub-scanning direction. However, control is made so as to skip the vacant regions.

For example, the embodiment is arranged to skip the distance Y1 after reading of a raster of level 1 and to continue reading the next rasters of level 2 at intervals of Y2.

Use of the information processing apparatus as described above permits efficient data reading in resolutions according to the output devices.

The above embodiment used the pyramid transform for classification of resolutions as described above, but there is no specific restriction thereon as long as an applied process is one capable of being performed by an arithmetic process, such as classification by the wavelet transform or the like, in general.

Further, writing/reading can be done efficiently by carrying out a proper compression operation for each of the images hierarchized by the resolutions.

For example, for the Laplacian image series, since a higher-resolution image has a narrower band as an output from a high-frequency passing filter, it includes only simple information of dots and lines in many cases.

Therefore, the data can be readily compressed to about one-sixth by execution of quantization and appropriate variable-length coding, which enables image recording with high efficiency.

On that occasion, the ratios of recording areas vary among the levels shown in FIGS. 6A and 6B, and a decoding circuit is necessary in the reading circuit 108. The above description concerned the still camera, but in the case of apparatus for searching data on a monitor and outputting the data through a high-definition image printer or the like, such as an electronic filing system, image data can be input or output effectively by applying the present invention as described above.

Further, the above embodiment was described as directed to still images, but the invention can also be applied to video systems compatible with high-definition moving pictures (HDTV or the like), and the like.

The block diagram of FIG. 1 and the other figures are illustrated to show the configuration for monochrome images, but addition of color luminance signals or the like as information will not change the configuration at all, of course. [Embodiment 2]

Figure 8:
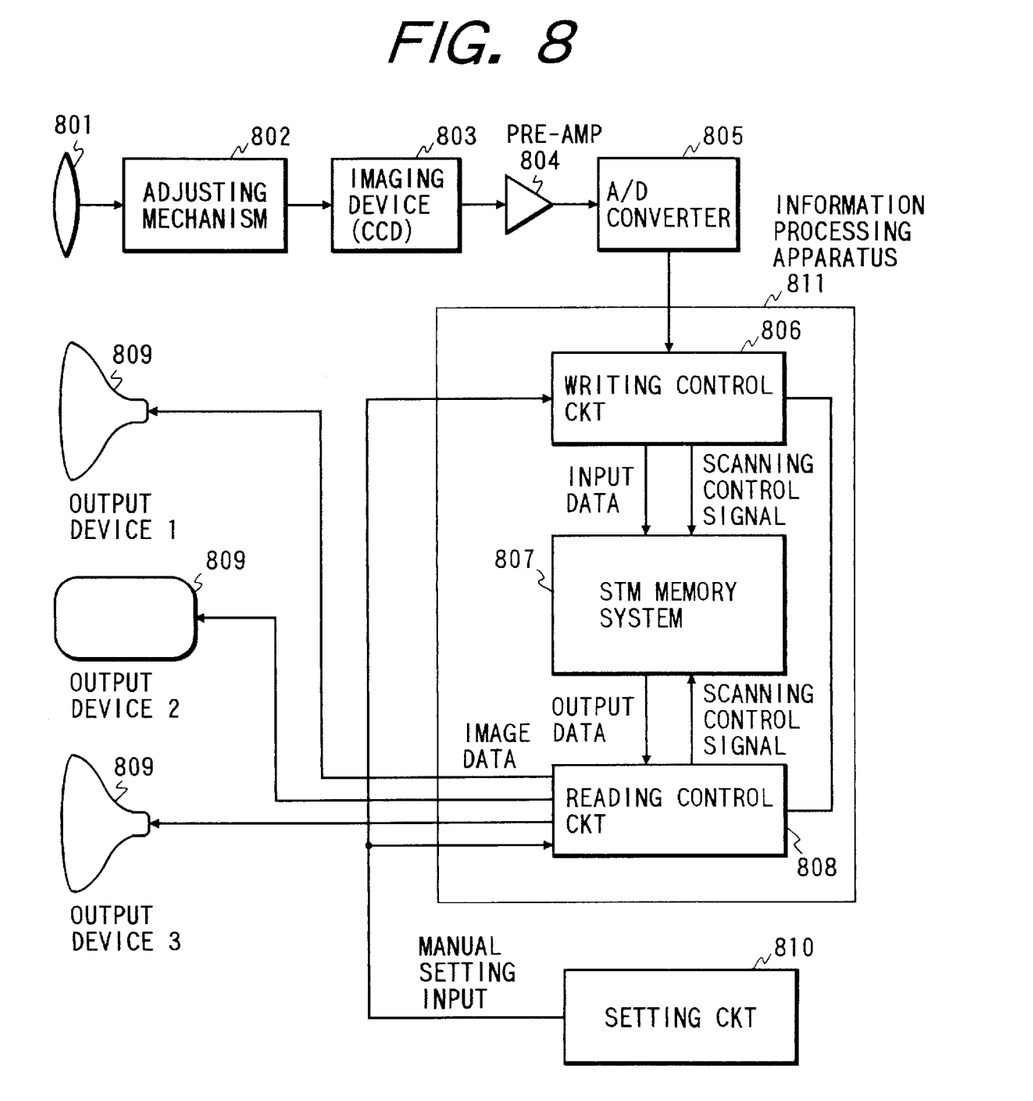
FIG. 8 is a block diagram to show the basic configuration of a still camera in Embodiment 2 using the information processing apparatus of the present invention.

FIG. 8 is a block diagram to show the basic configuration of the still camera in Embodiment 2 using the information processing apparatus of the present invention.

Described referring to FIG. 8 is the operation of recording partially in a high definition and the operation of later input in details in Embodiment 2 of the present invention.

Recording information is input of a high-definition image captured by the still camera in the same manner as in Embodiment 1. The configuration of the system is substantially the same as that in Embodiment 1.

Image data passing the elements of 801 to 805 in FIG. 8 is put into the writing control circuit 806. A user gives a necessary resolution to the writing control circuit 806 through the setting circuit 810.

Designation of this resolution may be effected on the whole of one frame or on a certain part in the frame. With an arrangement capable of recording only a certain part in the frame at a high definition, the amount of data to be processed can be decreased by recording only an object at a high definition but recording the background at a lowered resolution, which can increase the recording rate.

Next described is the operation upon capture of image.

Similarly as in Embodiment 1, the image information incident through the lens 801 is adjusted by the adjusting mechanism 802, including the aperture stop, shutter, and so on, to enter the next imaging device 803 at an accurate level.

Then the image is converted to an electric signal, the electric signal is amplified by the preamplifier 804, and the amplified signal is converted to a digital signal by the A/D converter 805.

Of course, the A/D converter 805 is provided with the filter for anti-aliasing, though not shown.

The image information after converted to the digital signal is supplied to the information processing apparatus 811, which is a characteristic part in the present invention.

The input information is rearranged by the writing control circuit 806 into a data string matched with the next STM memory system.

Here, a part of the image signal passes the writing control circuit 806 as it is, to be supplied to the reading control circuit 808, where the resolution is dropped to a resolution suitable for an output device and thereafter the signal is output to the appropriate output device as an image monitor. An operator performs designation of resolution as watching this image.

Figure 9:
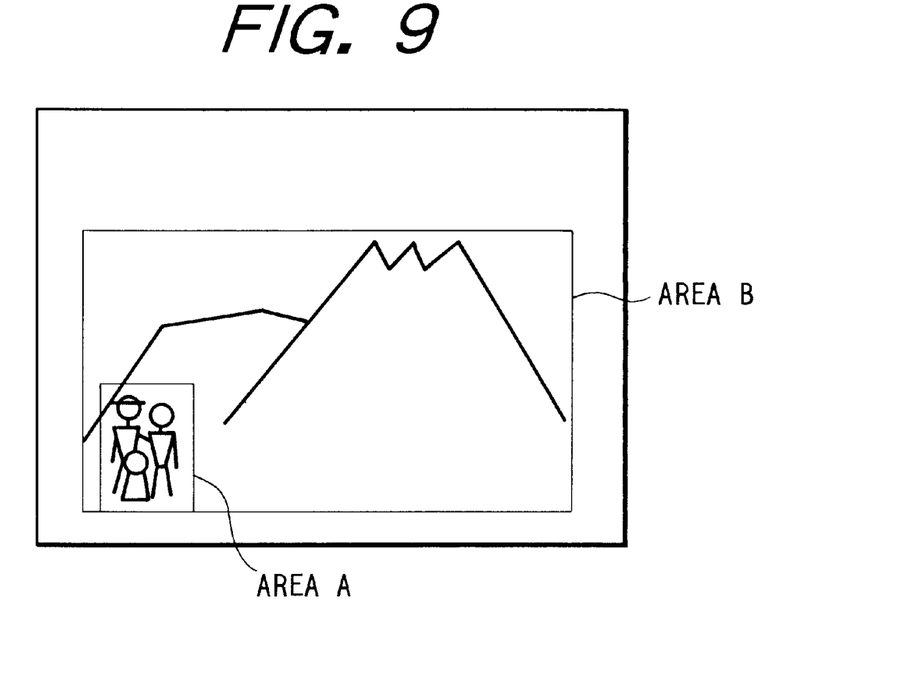
FIG. 9 is a drawing to illustrate an example of recording-reproducing operation of Embodiment 2.

Now, supposing an image signal as shown in FIG. 9 is recorded, the operator can designate level n, having a high resolution, for area A because of a desire to record a fine image of faces of people and the like, level m, having a little lower resolution, for area B because of existence of structures of mountains and the like, though being the background, and level 1 for the portion with little structure, including the sky. For example, in this case of designation, the image can partially be recorded in the resolutions irrespective of the output device monitoring it and thus, upon later reproduction, only the image of the people can be printed in a high resolution.

Next described is the practical operation of input of information in different levels as described.

A high-definition image signal supplied to the information processing apparatus 811 is first put into the writing control circuit 806.

The data is subjected to classification of level of resolution, for example, by the pyramid transform discussed in Embodiment 1.

For simplicity, here is explained an example in which level n corresponds to the resolution of G0 of FIG. 7, level m to the resolution of G1, and level 1 to the resolution of G2.

Image signals recorded by this are L0, L1, and G2 in FIG. 7.

The writing control circuit 806 preliminarily rearranges the data according to the resolutions, as shown in Embodiment 1, and writes only data of G2 at level 1, necessitating only the resolution of G2 upon writing.

The unit movement amount in the sub-scanning direction (Y) at that time is controlled to y1. Since at this time 100% of transmission rate is used for data recording of level 1, the data can be recorded very quickly.

Next, writing of level m of the background structures in FIG. 9 is recording of L1 in addition to G2.

In the case of the present embodiment, since the data amount of L1 is four times larger than G2, the total recording amount is five times larger than what was recorded as G2.

Therefore, the transfer rate in this case is one-fifth of that in the case of writing of only G2. For putting the image data of L1 between rasters recording the image data of G2 as in Embodiment 1, the unit movement amount of sub-scanning is set to one-fifth, ym.

Similarly, when the recording data becomes of the resolution of level n for the part of people in FIG. 9, data of G2, L1, and L0 is recorded.

Since the data amount of L0 is four times larger than the data amount of L1, the data of L0 is written between rasters arranged at intervals of ym, and the unit movement amount of sub-scanning is thus set to one-fifth of ym (or to yn).

In the arrangement wherein the writing control circuit 806 rearranges the data as described above, reading of data is carried out in such a way that the image of the resolution G2 is obtained by reading at the sub-scanning intervals y1, the image of G1 is obtained from the data G2 and L1 read out at the sub-scanning intervals ym, and the image of the highest resolution G0 is obtained from the data G2, L1, and L0 read out at the sub-scanning intervals yn.

The portion recorded at the high resolution can be read out at the resolution of G2 by reading it at the sub-scanning intervals fixed to y1 or at the resolution of G1 by reading it at the intervals fixed to ym, which is the same as in the case shown in Embodiment 1.

[Embodiment 3]

Embodiment 3 is a searching method in the recording/reproducing apparatus shown in Embodiment 1 and Embodiment 2.

Since the present invention permits information data to be read out easily at various levels, it is easy to read out information data at a low level and to perform searching using it. This will be explained with an example of image information.

For searching the information written by Embodiment 1 or 2, using a low-resolution monitor, and printing it in a high definition, the image information recorded is first read out at a low resolution compatible with the resolution of the searching monitor, fairly in the same manner as in Embodiment 1.

For example, let us suppose it was data of the level of G3 shown in FIG. 7.

Figure 10:
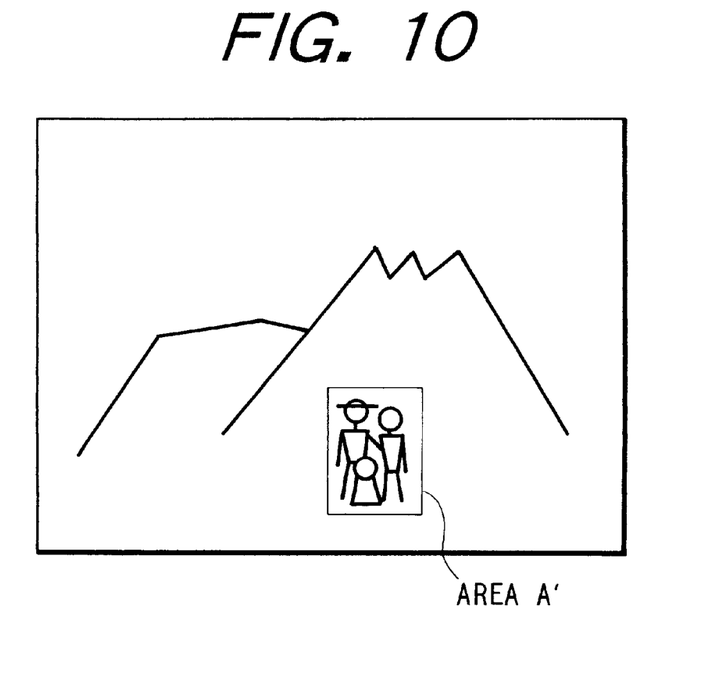
FIG. 10 is a drawing to illustrate an example of an image searching method of Embodiment 3.

Then the operator, looking at it, selects a portion desired to be output at a high definition (area A' in the drawing) as moving the cursor or the like on the screen, as shown in FIG. 10.

The setting circuit 110 (or 810) in FIG. 1 (or in FIG. 8) supplies the area information to the reading control circuit 108 (808), and only that portion is again read out at the high resolution.

However, since the high-resolution information of this part is all recorded near the same part of information of the level G3 output on the screen, a preferred image can be obtained readily upon reproduction by setting the unit movement amount in the sub-scanning direction (Y) according to a necessary resolution and continuously reading out the information from a starting point at the position where the information of the level G3 of this part is written.

Finally, the above embodiments were described as to the memory system using the STM technology, but the present invention can be applied to any systems using physical phenomena caused by close placement of the probe to the medium, as in an atomic force microscope or in a magnetic force microscope.

Since the apparatus according to the present invention has the control mechanism arranged to classify the input information in the levels according to the resolutions necessary upon reproduction and to read only a necessary region as described above, the apparatus can rearrange the input information as classifying it according to the levels used, record the thus rearranged information in different regions on the recording medium, and read out the information as accessing only the necessary region in accordance with the level of resolution necessary upon reproduction, whereby the reading time can be decreased largely with eliminating wasteful access to data.

When it is also applied to searching of image or the like, the invention can provide the information processing apparatus capable of performing further quicker image search.

What is claimed is:

1. An apparatus for scanning a recording medium by means of a probe and recording and reading data by means of physical interaction occurring between the recording medium and the probe, comprising:

means for generating a plurality of image data with different resolutions from the same image information;

means for recording on the recording medium the respective image data as a plurality of data bit trains disposed in a first direction by scanning the recording medium by means of the probe, wherein the data bit trains of the image data having a low resolution are discretely disposed and the data bit trains of the image data having a high resolution are disposed between the data bit trains of the image data having a low resolution;

means for reading the image data by repeating an operation for scanning on the data bit trains by means of the probe and an operation for moving the probe to the first direction and positioning it on the other data bit train; and control means for changing a moving distance of the probe to the first direction in accordance with the resolution of the image data to be read.

2. A method for scanning a recording medium by means of a probe and recording and reading data by means of physical interaction occurring between the recording medium and the probe, comprising the steps of:

generating a plurality of image data with different resolutions from the same image information;

recording on the recording medium the respective image data as a plurality of data bit trains disposed in a first direction by scanning the recording medium by means of the probe, wherein the data bit trains of the image data having a low resolution are discretely disposed and the data bit trains of the image data having a high resolution are disposed between the data bit trains of the image data having a low resolution; and reading the image data by repeating an operation for scanning on the data bit trains utilizing the probe and an operation for moving the probe to the first direction and positioning it on the other data bit trains, wherein a distance of the probe to the first direction is changed in accordance with the resolution of the image data to be read.

* * * * *

UNITED STATES PATENT AND TRADEMARK OFFICE
CERTIFICATE OF CORRECTION

PATENT NO. : 5,995,704
DATED : November 30, 1999
INVENTOR(S) : SHUNICHI SHIDO

It is certified that error appears in the above-identified patent and that said Letters Patent is hereby corrected as shown below:

ON THE TITLE PAGE

[57] Abstract:

Line 4, "including," should read --including--; and
Line 7, "of of" should read --of--.

COLUMN 1:

Line 16, "material" should read --materials--;
Line 35, "real" should read --a real--;
Line 56, "atomic" should read --an atomic--; and
Line 67, "layers" should read --layer--.

COLUMN 2:

Line 2, "chalcogenides," should read --chalcogenide--;
Line 8, "for" should read --of--; and
"of" should read --for--;
Line 12, "100 p$\mu$," should read --100 $\mu$m,--;
Line 18, "as database" should read --(as an example of a database--;
Line 39, "a" should read --the--;
Line 40, "the still" should read --a still--; and
Line 44, "hundred" should read --one hundred--.

UNITED STATES PATENT AND TRADEMARK OFFICE
CERTIFICATE OF CORRECTION

PATENT NO.    : 5,995,704
DATED         : November 30, 1999
INVENTOR(S)   : SHUNICHI SHIDO Page 2 of 2

It is certified that error appears in the above-identified patent and that said Letters Patent is hereby corrected as shown below:

COLUMN 3:

Line 58, "converted" should read --being converted--; and
    Line 63, "an" should read --a--; and
             "a" should read --an--.

COLUMN 6:

Line 27, "anyone" should read --any one--; and
             "same." should read --level.--.

COLUMN 8:

Line 14, "[Embodiment 2]" should read --¶[Embodiment 2]--;
    Line 49, "converted" should read --being converted--; and
    Line 60, "as" should read --while--.

Signed and Sealed this

Fifth Day of December, 2000

Attest:

Q. TODD DICKINSON

Attesting Officer

Director of Patents and Trademarks